April 17, 1962 M. C. FERRE 3,030,021

COMPUTING APPARATUS

Filed Jan. 13, 1955 6 Sheets-Sheet 1

INVENTOR.
MAURICE C. FERRE.
BY Robert Hockfield
HIS ATTORNEY.

INVENTOR.
MAURICE C. FERRE.
BY Robert Horsfield
HIS ATTORNEY.

*INVENTOR.*
MAURICE C. FERRE.
BY Robert Hochfield
HIS ATTORNEY.

*INVENTOR.*
MAURICE C. FERRE.
*BY* Robert Hockfield
HIS ATTORNEY.

April 17, 1962 M. C. FERRE 3,030,021

COMPUTING APPARATUS

Filed Jan. 13, 1955 6 Sheets-Sheet 5

INVENTOR.
MAURICE C. FERRE.

BY Robert Hochfield

HIS ATTORNEY.

April 17, 1962 M. C. FERRE 3,030,021

COMPUTING APPARATUS

Filed Jan. 13, 1955 6 Sheets-Sheet 6

INVENTOR.
MAURICE C. FERRE.
BY Robert Hockfield
HIS ATTORNEY.

United States Patent Office 3,030,021

Patented Apr. 17, 1962

3,030,021

COMPUTING APPARATUS

Maurice C. Ferre, Ridgefield, Conn., assignor, by mesne assignments, to Schlumberger Well Surveying Corporation, Houston, Tex., a corporation of Texas Filed Jan. 13, 1955, Ser. No. 481,565

22 Claims. (Cl. 235—181)

This invention relates to computing apparatus and, more particularly, pertains to new and improved computers for deriving a selected correlation between two functions $f(x)$ and $g(x)$ which may be the same or different.

Various types of computers and formulae have been proposed for deriving the auto-correlation or cross-correlation functions of time-varying signals. For example, in arriving at a correlation function, $C(h)$, of the function $f(x)$ and $g(x)$ the following relationship may be employed:

$$\underset{M\to\infty}{C(h)}=\frac{1}{2M}\int_{-M}^{+M}f(x)g(x+h)dx \qquad (1)$$

where integration is performed between limits +M and —M as M approaches infinity, and $h$ is a correlation variable. In general, for certain applications where finite limits are required, the correlation function may be properly expressed as follows:

$$C(h)=\frac{1}{x_2-x_1}\int_{x_1}^{x_2}f(x)g(x+h)dx \qquad (2)$$

One form of apparatus for obtaining the foregoing correlation employs special tracings of the functions under computation, and light is passed through both tracings, which may for example be superimposed, thereby to obtain the product required for the above Equation 2. In addition, the apparatus includes an integrator for obtaining a time-integration of the product. It is evident that this type of apparatus is relatively complex and may not always provide a desired speed of operation.

It is, therefore, an object of the present invention to provide a new and improved correlation computer which is relatively simple and inexpensive to construct and yet is entirely efficient and reliable in operation.

Another object of the present invention is to provide a new and improved correlation computer for performing a desired correlation between two functions, which may be the same or different, with speed and accuracy.

A system for deriving a correlation function in accordance with the present invention is adapted to employ record means having indicia depicting the functions $f(x)$ and $g(x)$ in terms of a modifying effect on incident radiant energy versus distance along a given path. The computer comprises means for projecting radiant energy toward the record means in a sheet-like beam of rectangular cross section intercepting the aforesaid path continuously between limits $x_1$ and $x_2$ and being affected by the indicia of each of these functions in succession to derive resultant radiant energy. Means are provided for indicating a preselected characteristic of the resultant radiant energy.

According to a particular embodiment of the invention, the computer comprises means for relatively displacing the beam of radiant energy and the indicia representing one of the functions $f(x)$ and $g(x)$ and the intensity of the resultant radiant energy is indicated as a function of such displacement. The displacement may be carried out manually or automatically thereby to obtain the required correlation function.

In accordance with another embodiment of the invention, light is projected through the record means in many bundles of substantially parallel rays transverse to the aforesaid path. The resultant radiant energy is intercepted by a recording medium disposed parallel to the aforesaid path thereby to provide a record of the correlation function in the nature of a spectrum.

The novel features of the present invention are set forth with particularity in the appended claims. The present invention, both as to its organization and manner of operation, together with further objects and advantages thereof, may best be understood by reference to the following description taken in connection with the accompanying drawings, in which:

Figure 1:
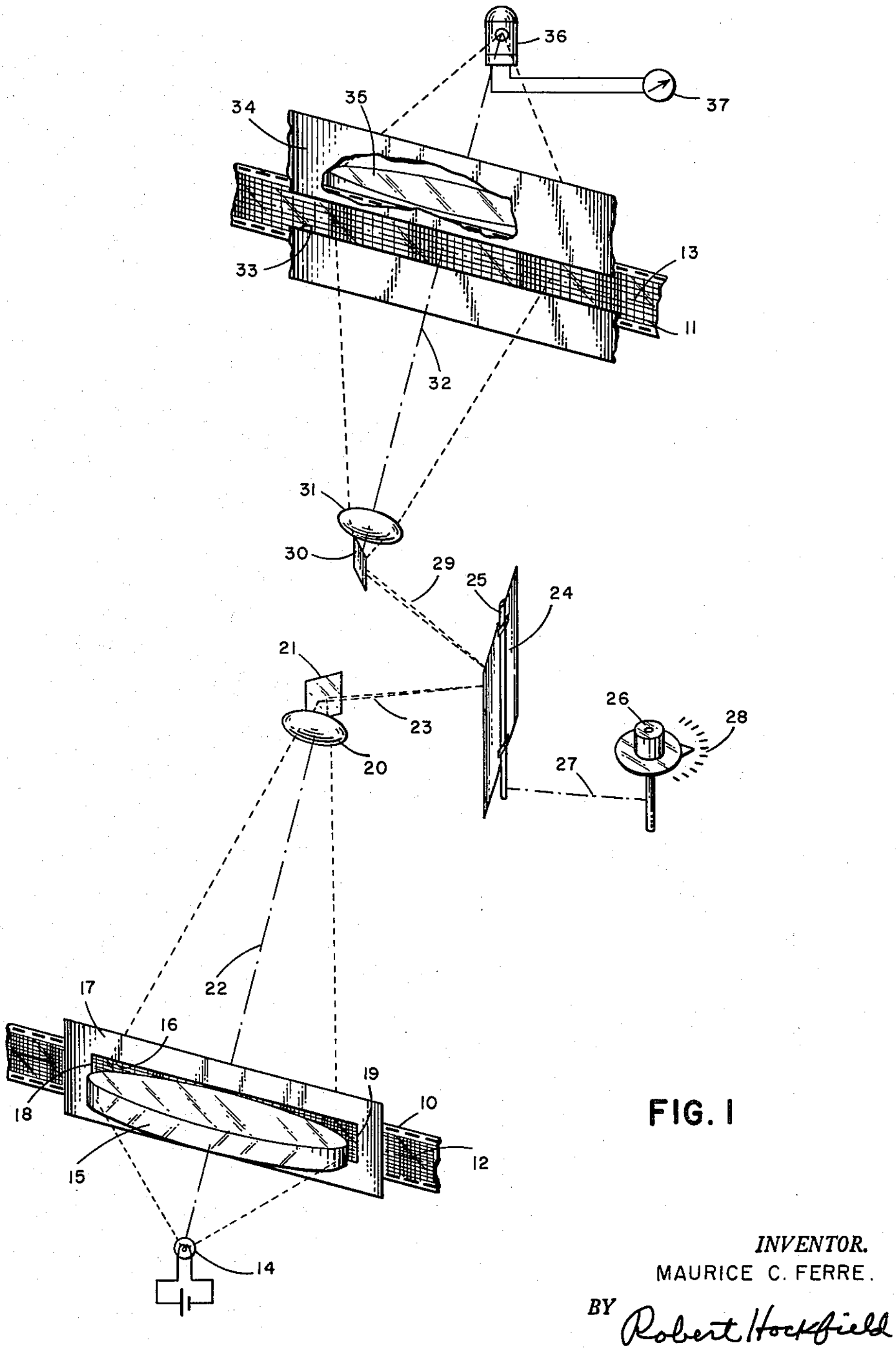
FIG. 1 is a perspective, schematic representation of a correlation computer constructed in accordance with one embodiment of the present invention.

In FIG. 1 of the drawings, a correlation computer embodying the present invention is shown to comprise record means including parallel film strips 10 and 11 having indicia depicting the functions $f(x)$ and $g(x)$ in terms of a modifying effect on incident radiant energy versus distance along a given path. Specifically, strip 10 is generally transparent and function $f(x)$ is recorded in a known manner in terms of varying density or opacity as a function of distance along the path represented by a broken line 12 extending longitudinally in the plane of the film strip. Similarly, function $g(x)$ is recorded as varying density versus distance along path 13 on film strip 11. Any of various known techniques may be employed for converting either a time-varying function or a position function to the type of record required for film strips 10 and 11 and therefore a detailed description is deemed to be unnecessary.

The correlation computer further comprises a source of radiant energy, such as a suitably energized light bulb 14 positioned to project light through the film strips 10 and 11 in succession. Light energy from source 14 is gathered by spherical condenser lens 15 and projected through a rectangular opening 16 of an opaque mask 17 disposed between the lens 15 and film strip 10. Accordingly, light energy is projected in a beam of rectangular cross section which intercepts path 12 continuously between limits defined by the edges 18 and 19 of opening 16. The edges 18 and 19 are suitably spaced from one another so that the distance along path 12 through which light energy falls corresponds to any desired limits $x_1$ and $x_2$ designated in Equation 2 above.

After being affected, or altered in intensity, by the indicia of film strip 10, light is intercepted by a first objective lens 20 spaced one focal length away from the film.

The image of strip 10 is thereby formed at infinity. The light is thus projected toward a mirror 21 which alters the course of light energy from the direction 22 to a direction 23 extending toward another mirror 24 supported by a shaft 25 which is rotatable about an axis perpendicular to a plane containing paths 12 and 13. Shaft 25 is mechanically coupled to a manual control knob 26 by a linkage schematically illustrated by a broken line 27 and the knob 26 is associated with marks or indicia 28 thereby to denote the position of mirror 24. Alternatively, automatic control may be employed in a manner which may be evident from discussions to be presented hereinafter.

Light energy along path 23 is reflected by the rotatable mirror 24 along a path 29 toward another mirror 30 which directs it through a second objective lens 31 along a path 32 which may be aligned with, but extends away from, path 22. Second objective lens 31 is one focal length away from strip 11, thereby causing the plane of the image of strip 10 to coincide with the plane of strip 11.

Before falling on film strip 11, light rays projecting in the direction of path 32 pass through a horizontal slot 33 in an opaque mask 34 which eliminates scattered light. After being modified by the indicia of film strip 11, light energy is gathered by a condenser lens 35 and directed toward a photoelectric cell 36 that is electrically coupled to an indicator 37, such as a voltmeter. It is thus evident that light energy is affected by the indicia of each of the functions $f(x)$ and $g(x)$ in succession to derive resultant radiant energy which is intercepted by the photoelectric cell. Control knob 26 operates as the means for displacing the sheet-like beam of radiant energy projecting along path 32 and film strip 11 relative to one another and thus meter 37 affords the means for indicating the intensity of the resultant radiant energy as a function of this displacement.

The size and optical characteristics of the lenses, masks and films may be arranged to provide any desired field of view. In general, source 14, mirror 24 and photocell 36 should be placed in conjugate positions with respect to the systems of lenses 15, 20, 31 and 35, and mirrors 21 and 30.

In describing the operation of the correlation computer represented in FIG. 1, it is assumed that the transparency of each of the films 10 and 11 along the respective paths 12 and 13 is proportional to or equal to $f(x)$ and $g(x)$, respectively. It is evident that since the functions depicted on film strips 10 and 11 effectively control light energy in succession, the resultant light energy intercepted by photoelectric cell 36 is the product of the values of the functions as depicted by the opacities of the film strips. Moreover, since the edges 18 and 19 of opening 16 in mask 17 effectively determine an interval in a range of values of the independent variable $x$, integration over this interval is automatically achieved in the resultant light energy. Accordingly, the voltage measured by indicator 37 is a measure of the correlation function.

To determine the correlation as a function of the correlation variable $h$, defined in Equation 1 above, control knob 26 is manipulated thereby displacing the beam of light energy directed along path 32 with respect to film strip 11. Voltage readings at indicator 37 are noted for the various positions of knob 26 relative to scale 28 and the resultant data may be tabulated thereby providing a record of the required correlation.

It is therefore evident that by employing apparatus embodying the present invention wherein the multiplication and integration operations are performed simultaneously, a much simpler and less expensive arrangement is possible than employed heretofore. Moreover, since both operations are carried out simultaneously, computations may be made with much greater speed and yet the reliability and accuracy of computations remain desirably high.

Of course, if desired, the functions depicted on film strips 10 and 11 may be identical. Accordingly, instead of deriving a cross-correlation function, a self-correlation function may be obtained.

Alternatively, photocell 36 may be positioned adjacent light source 14 and mirror 24 suitably positioned so that light energy is reflected back along path 23 and along a path slightly displaced relative to path 22. In this way, a self-correlation function may be obtained for the record on film strip 10; and the mirror 30, lenses 31 and 35, strip 13 and mask 33 are not required.

It is to be understood that although optical elements 15, 20, 31 and 35 have been illustrated as being simple lenses, more complex lens arrangements may be required for various applications. However, this portion of the system may employ elements of well-known construction and a more detailed description is deemed unnecessary to an understanding of the invention.

In the modifications now to be described, lens elements have been omitted for the sake of clarity and simplicity of representation, but it should be understood that lenses should be employed wherever necessary.

Figure 2:
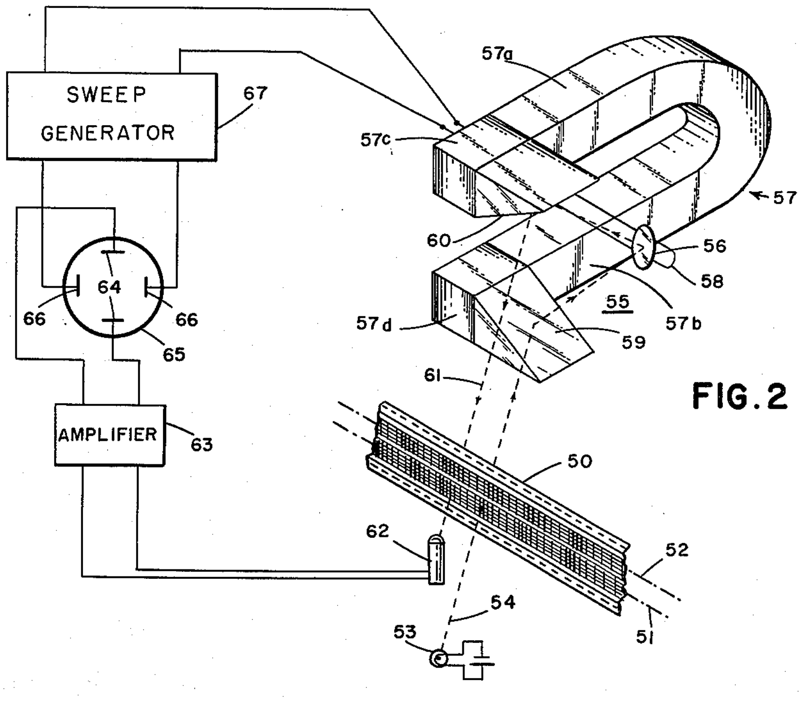
FIGS. 2 and 3 are perspective, schematic illustrations of other forms of correlation computers embodying the invention.

In FIG. 2, there is shown a film strip 50 on which function $f(x)$ is represented along a path 51 and the function $g(x)$ is represented along a path 52 parallel to path 51. A suitable lens and mask arrangement similar to that shown in FIG. 1 may be employed whereby light energy from a source 53 is projected in direction 54 toward path 51 in a rectangular or sheet-like beam extending toward a triorthogonal mirror system 55.

Mirror system 55 comprises a mirror 56 of a galvanometer including a horseshoe type magnet 57. A rotatably supported, elongated coil 58 extends between the pole pieces 57*a* and 57*b* of the magnet and carries mirror 56. The triorthogonal system 55 further comprises prism-shaped pieces supported at each of non-magnetic extensions 57*c* and 57*d* of the pole pieces of the horseshoe magnet 56 and having inclined, reflective surfaces 59 and 60 so that after reflections by elements 59, 56 and 60, light energy is returned in a sheet-like beam toward film strip 50 along a path 61 displaced vertically relative to path 54. The beam extending in direction 61 intercepts path 52 depicting the function $g(x)$ and thus after light energy is affected by the indicia of the two functions, it is intercepted by a photoelectric cell 62. It should be noted that preferably the plane of symmetry intermediate poles 57*a* and 57*b* of magnet 57 is arranged to intercept film strips 50 along a line equidistant from paths 51 and 52, and the axis of coil 58 lies in this plane.

Photocell 62 is electrically coupled to an amplifier 63, in turn, coupled to vertical deflection plate 64 of a conventional cathode ray tube 65, illustrated schematically. Cathode ray tube 65 also includes horizontal deflection plates 66 coupled to a sweep generator 67 that produces a voltage which may be of saw-tooth form. Sweep generator 67 is also synchronously electrically coupled to coil 58 of the mirror-galvanometer.

In operation, the voltage from sweep generator 67 produces a deflection of the mirror 56 of galvanometer coil 58 whereby the sheet-like beam defined by axis 61 is periodically displaced along path 52. The sweep trace developed on cathode ray 65 is displaced in synchronism with the sweep of the light beam and since the vertical amplitude of the sweep trace is dependent upon the resultant energy intercepted by photoelectric cell 62, a curve is traced on the viewing screen of cathode ray tube 65. This curve represents the correlation between the functions recorded along paths 51 and 52 as a function of the correlation variable.

If desired, a record may be made of the curve displayed on the viewing screen of cathode ray tube 65 in any well-known manner. For example, successive photographs may be taken of the viewing screen as film strip 50 is displaced in a direction parallel to paths 51 and 52. Thus, a continuous record may be obtained and any suitable mean may be provided for relating the photographs to successive positions along film strip 50.

For some applications, instead of merely obtaining a correlation function, it may be desirable to obtain information regarding the "best fit" of the functions $f(x)$ and $g(x)$ relative to one another within an interval $x_1$—$x_2$ for various values of correlation variable, $h$, of Equation 1 above. In other words, it may be of interest to find the value or values of $h$ wherein the correlation function, C, has a maximum value. For example, such computations may be utilized in connection with the comparison of functions derived by apparatus used to determine the dip of strata traversed by a borehole. Apparatus of this type is disclosed in Patents 2,176,169 and 2,427,950 of Henri-Georges Doll.

Figure 3:
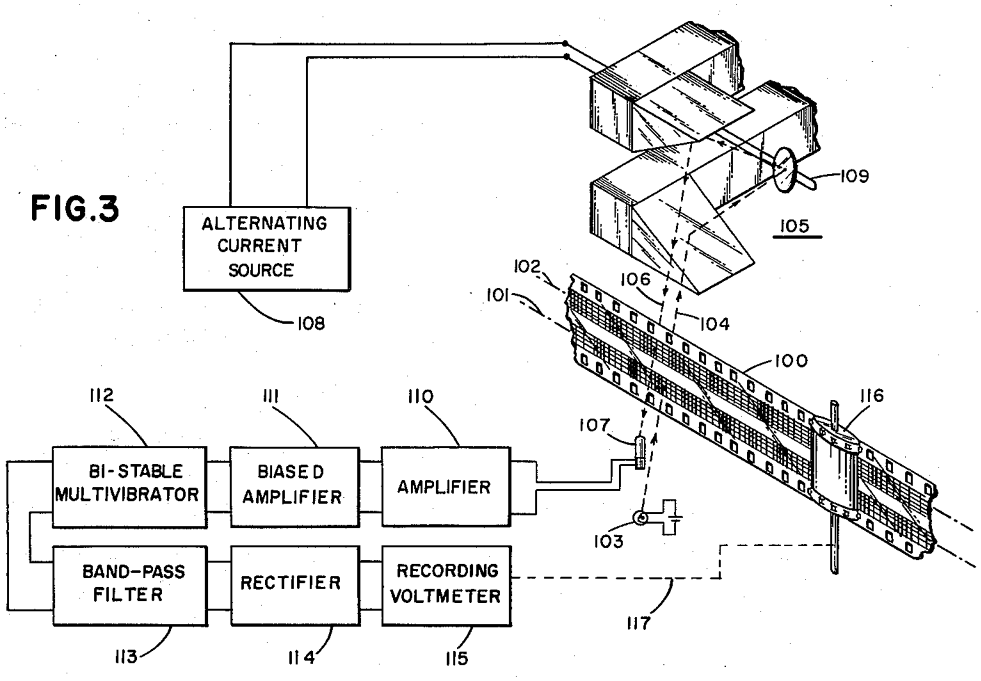

Apparatus for deriving the "best fit" between two functions is illustrated in FIG. 3. A film strip 100 is provided with two sections of indicia extending along paths 101 and 102, each having an opacity representing one of the functions $f(x)$ and $g(x)$. Light energy from a source 103, after being suitably formed by a mask and lens arrangement (not shown) into a sheet-like beam, is directed along an axis 104 and traverses the indicia of path 101. Multiple reflections occur at a triorthogonal mirror arrangement 105, similar to the one represented in FIG. 2, and light is returned along an axis 106. After traversing the indicia of path 102 light energy is intercepted by a photoelectric cell 107. A source of alternating potential 108 is coupled to coil 109 of the galvanometer associated with triorthogonal mirror 105 so that a recurrent sweep occurs in a manner similar to that described in connection with FIG. 2; however, the sweep may preferably have the shape of a triangular wave.

Photocell 107 is coupled to an amplifier 110, in turn, coupled to a conventional self-biased amplifier 111, arranged in a manner to be more apparent hereinafter, to translate applied signal voltages having a selected amplitude. The output of biased amplifier 111 triggers a bi-stable multivibrator 112 which is coupled to a band-pass filter 113. The output of filter 113 is supplied to a rectifier 114, in turn, coupled to a recording voltmeter 115 having a recording medium displaced in synchronism with movement of film strip 100 by means of a sprocket wheel 116 having its teeth in meshing engagement with the sprocket holes of the film strip and a suitable mechanical linkage schematically illustrated by a broken line 117.

Figure 4:
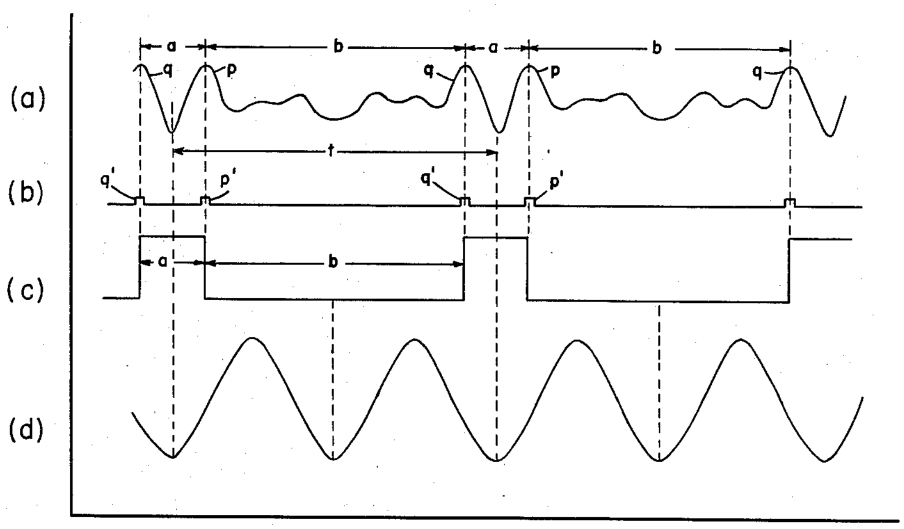
FIG. 4 is a graph of various wave forms useful in explaining the operation of the apparatus shown in FIG. 3.

In describing the operation of the modification illustrated in FIG. 3, occasional reference will be made to the wave forms illustrated in FIG. 4 which portrays various wave forms plotted to a common time scale. As the mirror mounted to coil 109 is displaced recurrently between its limits of rotation in response to the potential supplied by alternating potential source 108, the intensity of the resultant light energy incident on photoelectric cell 107 varies in accordance with the correlation function between indicia along paths 101 and 102 of film strip 100. This light energy, of course, is converted by the photoelectric cell to a time-varying electrical signal which may have a form such as represented by the curve in FIG. 4*a*. It will be observed that this curve has a repetitive period corresponding to the period of oscillation of the rotating mirror and that during each period $t$, two maximum values are exhibited. These maxima are represented by the peaks $p$ and $q$ in the curve of FIG. 4*a* and within period $t$, they are spaced by an interval $b$; the maxima between adjacent intervals $t$ are spaced by an interval $a$. It is apparent that the ratio between the periods $a$ and $b$ is a function of the displacement between the indicia along paths 101 and 102 of the film strip 100 at which the "best fit" occurs.

In order to obtain a measurement of this ratio, amplifier 111 is self-biased so that it follows and passes only the peaks of the photoelectric cell signal supplied to it by amplifier 110. The resultant signal is represented in FIG. 4*b*. It will be observed that this signal exhibits pulses $p'$ and $q'$ which correspond to the peaks $p$ and $q$, respectively, of the curve in FIG. 4*a*. Since bi-stable multivibrator 112 is triggered by the pulse signal of FIG. 4*b*, the resultant square wave developed by the multivibrator exhibits positive and negative undulations corresponding in timing to the periods $a$ and $b$. By Fourier analysis, it may be easily shown that the square wave of FIG. 4*c* exhibits a component at a frequency twice that of the signal supplied by source 108 and this component has an amplitude proportional to the displacement between the indicia along paths 101 and 102 at which the "best fit" occurs; in effect, the amplitude of the component is essentially zero when the square wave is perfectly symmetrical, i.e., $a=b$.

Accordingly, band-pass filter 113 is tuned to a frequency twice that of the signal supplied by source 108 so that all frequencies, except the double frequency component represented in FIG. 4*d*, are attenuated and the double frequency component is supplied to rectifier 114. The unidirectional potential thus developed has a magnitude corresponding to the amplitude of the double frequency component and this potential is applied to recording voltmeter 115. Since the recording medium of voltmeter 115 is displaced in synchronism with film strip 100, a continuous record is made of the best fit between the indicia along paths 101 and 102 for any desired length of film strip 100.

It may be appropriate to point out that multivibrator 112 should be initially adjusted for a predetermined extreme position of the rotating mirror in triorthogonal arrangement 105. Otherwise, an error in the sign of the correlation variable, $h$, might result. Of course, any known automatic method may be employed to provide such synchronization.

From the foregoing discussion, it is apparent that only the largest maximum is measured in the apparatus shown in FIG. 3. Moreover, if the correlation curve exhibits two maxima of unequal size wherein the larger of the two progressively decreases in size while the smaller increases, the apparatus automatically switches to the appropriate one in due time.

Figure 5:
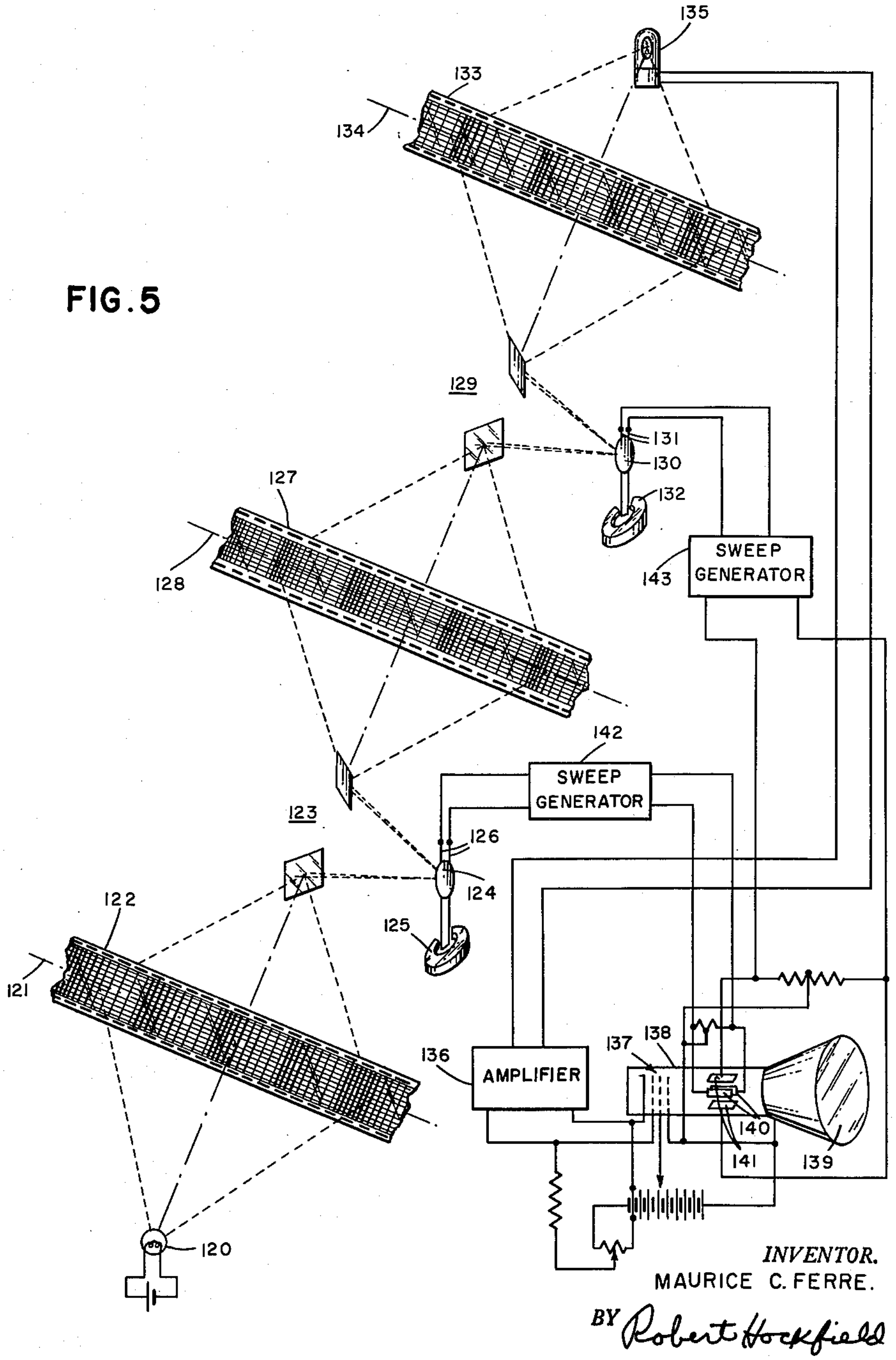
FIG. 5 illustrates another arrangement of a correlation computer embodying the invention.

In the modification of the apparatus shown in FIG. 5, a more complex calculation may be performed on three functions, namely $f_1(x)$, $f_2(x)$ and $f_3(x)$. More precisely, the following new type of correlation function is obtained:

$$C_{x_1}^{x_2}(h_1, h_2)=\frac{1}{x_2-x_1}\int_{x_1}^{x_2} f_1(x)f_2(x+h_1)f_3(x+h_2)\,dx \quad (3)$$

Light from source 120, after being suitably formed into a sheet-like beam, is projected toward a path 121 of a film strip 122 containing a variable-density plot of the function $f_1(x)$. After traversing film strip 122, light energy is intercepted by a mirror arrangement 123 similar to that represented by the numerals 21, 24 and 30 in FIG. 1; however, a rotatable mirror 124 is included in a mirror galvanometer comprised of a magnet 125 and a coil 126. From mirror arrangement 123 light is directed toward another film strip 127 having indicia along a path 128 parallel to path 121 and depicting the function $f_2(x)$.

Light energy, after traversing film strip 127, is intercepted by a mirror arrangement 129 similar to arrangement 123 and including a rotatable mirror 130 supported by a galvanometer coil 131 that is associated with the magnet 132. From mirror arrangement 129 light energy is directed toward another film strip 133 on which indicia in the form of a variable-density track depict the function $f_3(x)$ along a path 134 parallel to path 128.

After traversing film strip 133, light is intercepted by a photoelectric cell 135 that is electrically coupled to an amplifier 136 whose output circuit is coupled to the intensity control electrode of an electron gun 137 of a conventional cathode ray tube 138.

To control the position at which electrons impinge on fluorescent viewing screen 139 of cathode ray tube 138, the tube is provided with horizontal deflection plates 140 and vertical deflection plates 141. Deflection plates 140 are coupled to a sweep generator 142 which produces, for instance, a saw-tooth type signal that is also supplied to coil 126 of galvanometer 124–126. Similarly, vertical deflection plates 141 are coupled to another sweep generator 143 which likewise provides a saw-tooth signal that is also supplied to coil 130 of galvanometer 130–132. Of course, other sweep wave forms may be employed. The operating frequencies for sweep generators 142 and 143 are selected so that for each small incremental change in displacement of the light energy produced by mirror 124, a complete sweep is developed in the light energy deflected by mirror 130. For example, the operating frequency of the sweep signal developed by generator 143 may be one hundred times that developed by generator 142.

From the preceding discussions of the earlier described correlation computers embodying the invention, it is obvious that the output of photocell 135 is representative of the new type correlation function, C, defined in Equation 3 above. To display this function, the position of the trace developed on viewing screen 139 is deflected in accordance with the two sweep signals and the intensity of the trace is controlled by the output of the photocell. Thus, the position at which maximum brightness of the trace occurs significantly represents the maximum value or values of the new type correlation function.

Figure 6:
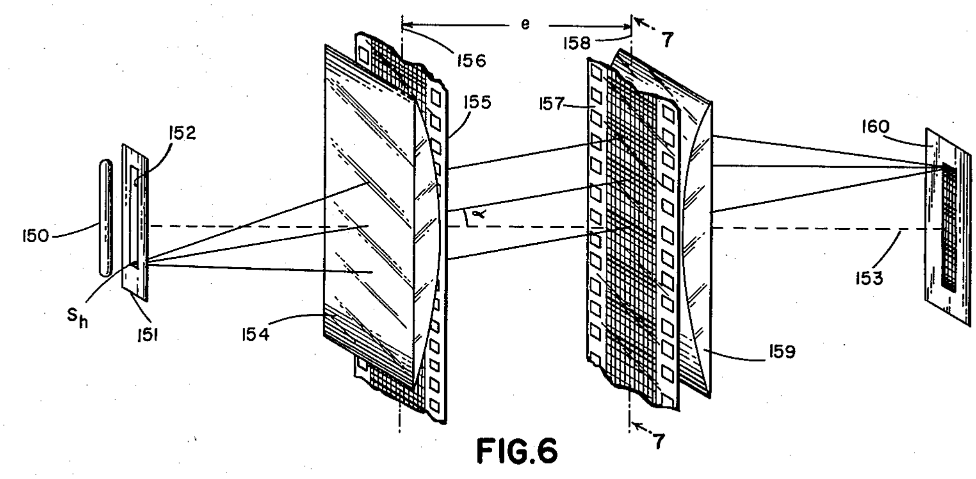
FIG. 6 is a schematic, perspective view of a correlation computer constructed in accordance with another embodiment of the present invention.

In the embodiment of the invention illustrated in FIG. 6, light from a long tubular source 150 is confined by a mask 151 having a rectangular slot 152 to a beam of rectangular cross section extending in the general direction of an axis line 153. Source 150 is in the focal plane of a first spherical lens 154, cut to a rectangular shape for simplicity of representation, having, for instance, a planar surface facing the source and a convex surface closely adjacent a film strip 155 on which a function $f(x)$ is plotted in terms of varying density along a path 156. Lens 154 and film strip 155 are distributed in spaced relationship along axis 153, and spaced from film strip 155 is another film strip 157 on which the function $g(x)$ is plotted in terms of varying density along a path 158. The spacing between the film strips is designated by the letter $e$ in FIG. 6. The output flux of light energy traversing film strips 155 and 157 is concentrated by a lens 159 on a recording medium, such as a photographic film or plate 160 positioned in the focal plane of lens 159.

In describing the operation of the embodiment represented in FIG. 6, it is assumed that in addition to $e$ being the distance between film strips 155 and 157, the quantity $x$ (shown in FIG. 7) represents the distances along the abscissa of each of the film strips. Consider first a bundle of light rays issuing from a point $S_h$ of opening 152. It will be noted that these rays are refracted by lens 154 and emerge as a bundle of parallel rays making an angle $\alpha$ with axis 153. Any light ray traversing film strip 155 at a position $x$ traverses film strip 157 at a position $(x+h)$, e.g. $h=e \tan \alpha$ and its intensity is reduced in proportion to $f(x)$ times $g(x+h)$. If, as illustratively shown in the cross sectional representation of FIG. 7, the selected incident bundle of light rays covers film strip 155 between the limits $x_1$ and $x_2$, the emergent light intensity is the required value of the correlation function expressed in Equation 1 above. This correlation function, of course, is expressed only for a particular value of the correlation variable, $h$.

Since light source 150 together with mask 151 may be considered as a line source schematically represented by the line 150′ in the focal plane of lens 154, the various points, such as $S_h$, of the source emit light beams which, after refraction through the lenses and absorption through films 155 and 157, converge on the conjugate points, as $I_h$, of a line image in the focal plane of lens 159. Accordingly, the brightness of every point $I_h$ of the line image is proportional to the value of the correlation function for the corresponding value of the correlation variable, $h$. As a result, sensitized film 160, after a conventional processing technique, provides a record in which the density of the exposed portion varies in accordance with the correlation function thereby to provide a record in the nature of an optical spectrum.

It is readily apparent that the several steps including reading out, multiplication, integration and scanning of the correlaton variable, $h$, involved in conventional computation of correlation functions are performed by apparatus embodying the invention simultaneously and the spectrum-like recording of the correlation function is obtained with speed and facility.

Instead of recording the correlation function on a photographic plate as shown in FIG. 6, any method of photometric measurement may be utilized. For example, the light falling on any one particular point $I_h$ may be observed with a photoelectric cell and the output of the photoelectric cell may be measured with a suitable meter.

Figure 8:
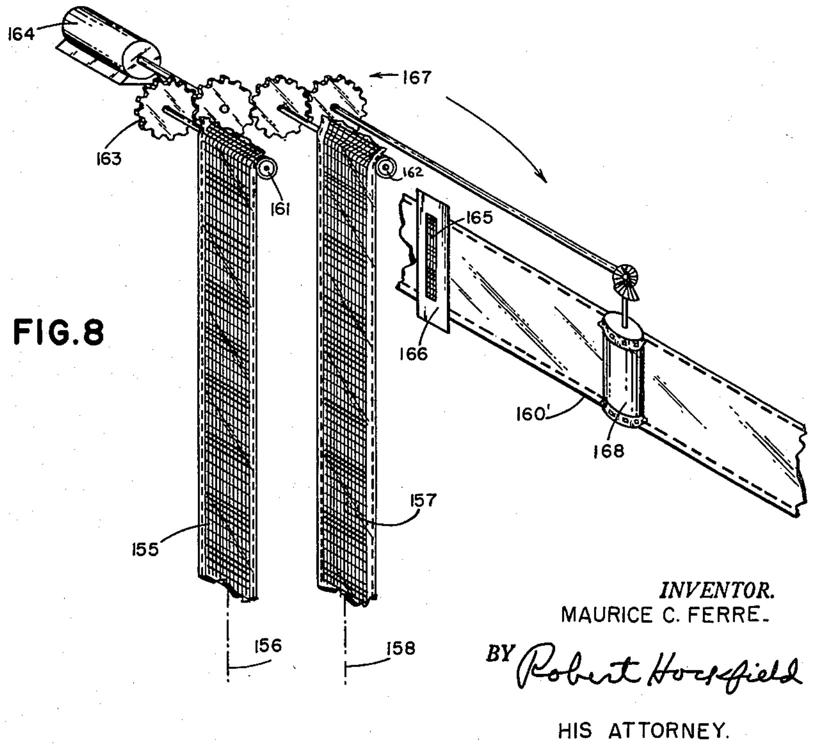
FIG. 8 represents a recording system which may be utilized in the embodiment of the invention, for example, as shown in FIG. 6.

In FIG. 8 there is shown a recording system suitable for use in the computer of FIG. 6. Sprocket wheels 161 and 162 are driven in synchronism, through a gear system 163 by a motor 164. Thus, film strips 155 and 157 are displaced in synchronism in parallel directions along paths 156 and 158. A recording film 160′ onto which light from strips 155 and 157 falls after passing through rectangular opening 165 of a mask 166 is displaced along a path disposed perpendicularly to paths 156 and 158 through the agency of another gear system 167 coupled to motor 164 and a driving sprocket 168.

If desired, a suitable optical arrangement may be provided so that film 160′ can be displaced parallel to films 155 and 157, but along a path out of the plane containing paths 156 and 158.

In operation, a correlation function is obtained that is a two-dimensional record having along one direction the parameter X which is in the nature of an average value of X over the interval of integration, namely $$X=\frac{x_1-x_2}{2}$$

Along a direction of constant X, the photographic density is a function of the quantity $h$ only. Along the other direction, the correlation variable $h$ is constant and the photographic density varies as a function of the parameter X. Accordingly, successive recordings may be made, each of which corresponds to the interval $x_1$—$x_2$, chosen in accordance with the particular application.

Figure 9:
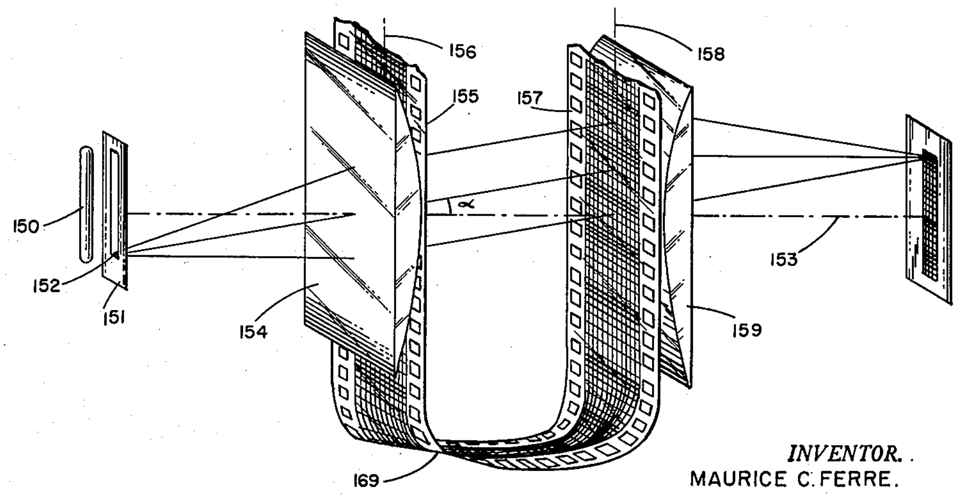
FIG. 9 illustrates a modification which may be made to the apparatus of FIG. 6.

While the film strips 155 and 157 have been described as depicting different functions, obviously the same function may be recorded on both strips. Accordingly, instead of a cross correlation function, an autocorrelation function may be obtained. Furthermore, if an autocorrelation function is to be computed around a large average value of the variable $x$, i.e., if $h$ is to be comprised of values between H and $H+\Delta H$, as shown in FIG. 9, the film strips 155 and 157 may be portions of a loop 169 of appropriate length.

Figure 10:
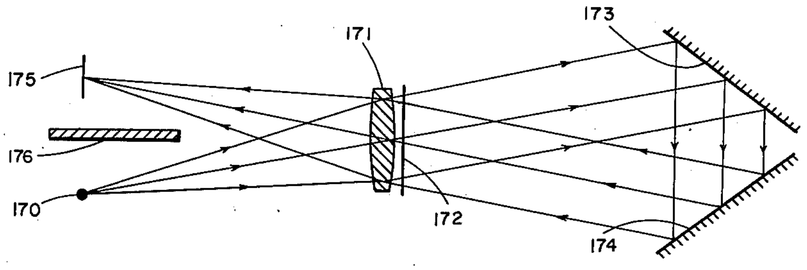
FIGS. 10 and 11 are views similar to that illustrated in FIG. 7 featuring respective modifications which may be made to the embodiment of the invention there shown.

In FIG. 10 there is shown a modification of apparatus for obtaining an autocorrelation spectrogram in accordance with the invention. In this cross sectional view, there is illustrated a line source schematically represented by a point 170 projecting light in a beam through a lens 171 before passing through a film strip 172. After modification by the film strip, light is reflected by a pair or more of suitably positioned mirrors 173 and 174 and returned through film strip 172 and lens 171 to a photographic film 175 positioned in the focal plane of the lens 171, but displaced from line source 170. An opaque baffle 176 is provided to prevent direct illumination of film 175 by source 170.

Figure 7:
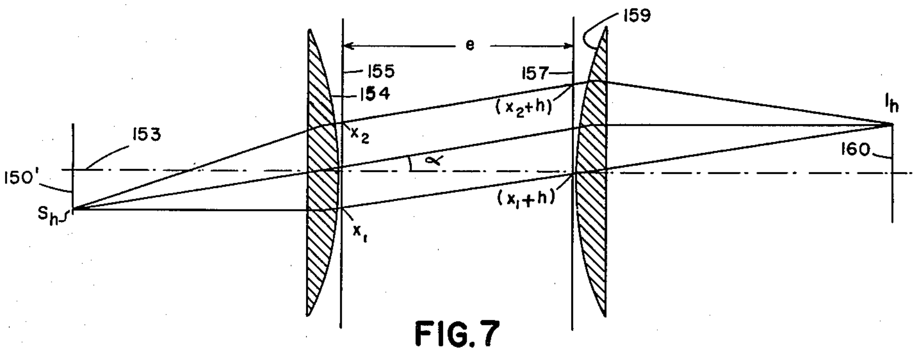
FIG. 7 is a cross-sectional view taken along line 7—7 of the apparatus illustrated in FIG. 6.

The operation of the arrangement illustrated in FIG. 10 is apparent from the discussion presented in connection with FIGS. 6 and 7 and it is sufficient to state that light energy in a sheet-like beam passes successively through the film strip 172 in opposite directions and its intensity is successively modified. Thus, as autocorrelation spectrogram is recorded on film strip 175.

Figure 11:
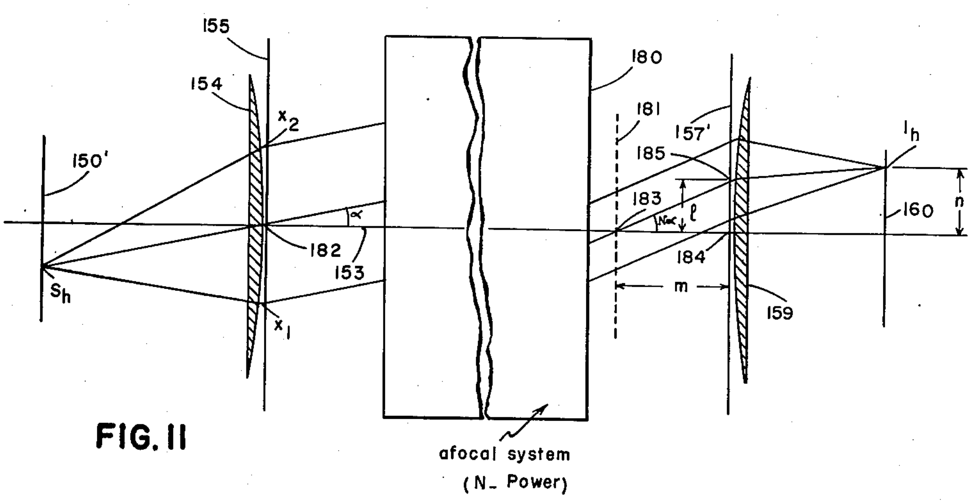

The modified system represented in FIG. 11 is generally similar to the one shown in FIGS. 6 and 7 and elements which are the same in both figures are represented by identical reference characters. This modification is intended to accommodate film strips 155 and 157' in which the records have not been made at the same $x$ scale. In order to accommodate this difference, an afocal optical system 180 is introduced between the film strips 155 and 157'.

Afocal system 180 may be of any conventional construction, such as that employed in a telescope in condition of normal use, and its power, N, may be smaller or larger than unity depending on whether an effective scale reduction or enlargement is desired. Moreover, it may be positive or negative thereby to provide images which may be direct or inverted. In the block diagram type illustration of FIG. 11, the afocal system 180 has a power, N, approximately equal to two.

Considering a parallel beam of light which crosses film 155 at an angle $\alpha$, the light beam emergent from the afocal system makes an angle $N\alpha$ with axis 153. The conjugate of film strip 155 through the afocal system will be a real or virtual image of the film represented by the dashed line 181 and its linear magnification is $1/N$. The importance of magnification $1/N$ will now be shown.

In FIG. 11, the numerals 182, 183 and 184 represent the intersections of the optical axis 153 with film strip 155, image 181 of film 155, and film strip 157', respectively. Thus, any light ray crossing the film strip 155 at 182 crosses film strip 157' at a point 185 such that $$l=N\alpha m \qquad (4)$$

where $l$ is the distance between points 184 and 185 and $m$ is the distance between points 183 and 184. In addition, the beam converges on photographic film 160 in such a manner that $$n=N\alpha f_2 \qquad (5)$$

where $n$ is the distance from axis 153 to point $I_h$, and $f_2$ is the focal length of lens 159. It is therefore apparent that the distance $e$ represented in FIGS. 6 and 7 is replaced in importance by the quantity $m$, and the resolution with respect to $h$ is a function principally of $N, m$, and $f_2$.

One application of the apparatus shown in FIG. 11 is that of making a Fourier analysis of a given wave form. As is well known, this type of analysis is customarily obtained by cross correlating a function to be analyzed $F(t)$ and sine waves of varying frequencies as follows:

$$A(\omega)=\frac{1}{\sqrt{2\pi}}\int_{\infty}^{\infty}F(t)\sin\omega t dt \qquad (6)$$

and $$B(\omega)=\frac{1}{\sqrt{2\pi}}\int_{-\infty}^{\infty}F(t)\cos\omega t dt \qquad (7)$$

Combining Equations 6 and 7 and employing a well-known trigonometric identity, the following relationship may be obtained:

$$F(t)=\sqrt{\frac{2}{\pi}}\int_0^{\infty}[A(\omega)\sin\omega t+B(\omega)\cos\omega t]d\omega \qquad (8)$$

This may also be written as the following equation:

$$F(t)=\sqrt{\frac{2}{\pi}}\int_0^{\infty}v(\omega)\sin[\omega x+\phi(\omega)]d\omega \qquad (9)$$

where $$v_{(\omega)}=\sqrt{A_{(\omega)}^2+B_{(\omega)}^2}$$

and $$\tan\phi(\omega)=\frac{B_{(\omega)}}{A_{(\omega)}}$$

$v(\omega)$ may be obtained by calculating the correlation functions of $f(t)$ and $\sin\omega t$, that is:

$$C(\omega,h)=\frac{1}{\sqrt{2\pi}}\int_{-\infty}^{+\infty}F(t)\sin(\omega t+h)dt \qquad (10)$$

and by looking for the particular value $h$ that makes $C(\omega,h)$ a maximum, i.e., $v(\omega)$=maximum value of $C(\omega,h)$. The correlation variable, $h$, represents, therefore, all possible values of phase shift, $\phi$, to be investigated. Obviously, the difficulty in obtaining the desired solution is that $F(t)$ must be correlated with an infinite number of sine waves and observation must be made to determine the phase shift that makes $C(\omega,h)$ a maximum value.

By constructing afocal system 180 in the apparatus of FIG. 11 in a known manner so that it has a continuously adjustable power, correlation in connection with the determination of Fourier analysis may be readily derived. By suitably mounting the lenses in the system, such as by means of helicoidal mounts, a very limited number of sine wave recordings on film strip 155 is required. For example, one film strip per octave may be employed and an analysis made within each octave by changing the power N in the ratio from 1 to 2.

Figure 12:
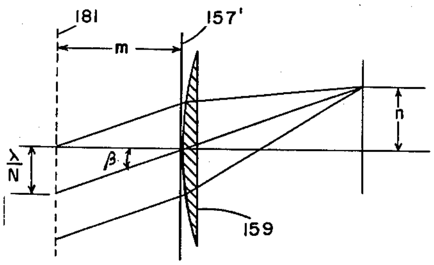
FIG. 12 is a representation of the arrangement of FIG. 11, but illustrating an alternative mode of operation.

It may be desirable that the calibration scale in terms of $\phi$ (or $h$) on recording medium 160 be independent of the frequency, $\omega$. To this end, let it be assumed that $\lambda$ is the "wave length" of the recorded signal on 155, that is, the distance between successive positions where the indicia represent maximum values is equal to $\lambda$. In the image 181, the wave length is $\lambda/N$ since the power of the afocal system is N. It is clear that if the correlation variable, $h$, is equal to 0 or $\lambda/N$, the correlation function must take the same value. In the apparatus shown in FIG. 11 these values of the correlation function are obtained when the light beam makes, in the space confined between image 181 and film 157', an angle 0 or $$B=\frac{\lambda}{N}/m$$

as shown in detail in FIG. 12. After being refracted through lens 159, the light rays converge toward two points spaced by $n=\tan Bf_2$ which depict the respective values of the correlation function. If the correlation variable is made equal to $\lambda/N$, the phase shift is $2\pi$ or 360° If, as indicated previously, $n$ is to represent a 360° phase shift, no matter what the value of $\omega$ may be, and therefore N, B must be constant and $$\frac{\lambda}{N}/m$$

must be constant. Consequently, $m$ must be proportional to $l/N$.

In the apparatus of FIG. 11, two conditions must be fulfilled, namely the system must be afocal and the conjugate 181 of film strip 155 must be at a distance from film strip 157' that is inversely proportional to the power, N. This may be obtained with a limited number of elementary lenses. It may be easily shown that the power, N, may be chosen arbitrarily within rather wide limits.

It may be appropriate to point out with reference to FIGS. 6, 7 and 10, 11 that the interval of integration $x_1$—$x_2$ might appear to be limited by the size of the lenses employed. However, if film strips 155 and 157 are moved in synchronism and continuously at a constant speed and film 160 is maintained in a fixed position, it will have integrated all light coming at points such as $I_h$ over an entire cycle of operation. It is thus evident that by feeding film strips 155 and 157 continuously from one end to the other, the record impressed on photographic film 160 is the correlation function corresponding to the entire interval of available values of $x$ rather than being limited to a certain interval $x_1$—$x_2$. There is no limitation in this interval other than the extent of the recording function $f(x)$ and $g(x)$ on the film strips.

In summary, it may be stated that the apparatus embodying the present invention may be employed for cross-correlation as well as for auto-correlation problems. In addition, the interval of integration may be adjusted to any desired value and is limited only by the extent of the recording.

If desired, one of the recordings may be compared with a master recording in order to determine the constancy of a given processing.

Although in the various embodiments and modifications of the present invention, variable density recordings are employed, it is obvious that other types of recordings may be employed. For example, a variable area record may be utilized together with a variable density record. This may be accomplished by using a cylindrical lens placed in front of the film carrying the variable area record in order to blur the light beam extending through it effectively to simulate a variable density record.

While particular embodiments of the present invention have been shown and described, it will be obvious to those skilled in the art that changes and modifications may be made without departing from this invention in its broader aspects. Therefore, the aim in the appended claims is to cover all such changes and modifications as fall within the true spirit and scope of this invention.

I claim:

1. A system for deriving a correlation between two functions which may be the same or different comprising: record means exhibiting a modifying effect on incident radiant energy, said effect varying along a first path in accordance with one of the functions and along a second path in accordance with the other of the functions; means for projecting radiant energy toward said record means in a sheet-like beam intercepting said record means along said first path; reflector means positioned to intercept radiant energy subsequent to interception by said record means for reflecting such radiant energy toward said second path, said reflector means including a movable portion for displacing radiant energy reflected toward said second path in the direction thereof; means for displacing said portion of said reflector means; and means for deriving indications of a characteristic of the radiant energy in said sheet-like beam subsequent to interception by said record means along said second path.

2. A system for deriving a correlation between two functions which may be the same or different comprising: record means having an opacity to incident radiant energy varying along a first path in accordance with one of the functions and along a second path in accordance with the other functions; means for projecting radiant energy toward said record means in a sheet-like beam intercepting said record means along said first path; reflector means positioned to intercept radiant energy subsequent to interception by said record means for reflecting such radiant energy toward said second path, said reflector means including a movable portion for displacing radiant energy reflected toward said second path in the direction thereof; means for displacing said portion of said reflector means; and means for deriving indications of the intensity of the radiant energy in said sheet-like beam subsequent to interception by said record means along said second path.

3. A system for deriving a correlation between two functions which may be the same or different comprising: first record means exhibiting a modifying effect on incident radiant energy, said effect varying along a first path in accordance with one of the functions; second record means exhibiting a modifying effect on incident radiant energy, said effect varying along a second path in accordance with the other of the functions; means for projecting radiant energy through said first record means in a sheet-like beam intercepting said first record means along said first path; reflector means positioned to intercept radiant energy subsequent to interception by said record means for reflecting such radiant energy toward said second record means along said second path, said reflector means including a movable portion for displacing radiant energy reflected toward said second path in the direction thereof; means for displacing said portion of said reflector means; and means for deriving indications of a characteristic of the radiant energy in said sheet-like beam subsequent to transmission through said second record means.

4. A system for deriving a self-correlation of a given function comprising: record means exhibiting a modifying effect on incident radiant energy, said effect varying along a path in accordance with the function; means for projecting radiant energy toward said record means in a sheet-like beam intercepting said record means along said path, said record means and said sheet-like beam being movable relative to one another in the direction of said path; means for intercepting radiant energy subsequent to transmission through said record means and for reflecting such radiant energy toward said record means in a sheet-like beam intercepting said record means along said path; and means for deriving indications of a characteristic of the radiant energy in said last-mentioned sheet-like beam subsequent to transmission through said record means.

5. A system for deriving a correlation function of two functions $f(x)$ and $g(x)$ which may be the same or different comprising: record means having indicia depicting the functions $f(x)$ and $g(x)$ in terms of a modifying effect on incident radiant energy versus distance, $x$, along respective given paths; means for projecting radiant energy toward said record means in a sheet-like beam intercepting said paths continuously between limits $x_1$ and $x_2$ and being affected by the indicia of each of said functions $f(x)$ and $g(x)$ in succession to derive resultant radiant energy; reflector means including a movable portion for relatively displacing said beam of radiant energy and the indicia representing one of said functions $f(x)$ and $g(x)$; means for displacing said movable portion of said reflector means; and means for indicating the intensity of said resultant radiant energy as a function of the aforesaid relative displacement between said radiant energy and the indicia.

6. A system for deriving a correlation function of two functions $f(x)$ and $g(x)$ which may be the same or different comprising: record means having indicia depicting the functions $f(x)$ and $g(x)$ in terms of a modifying effect on incident radiant energy versus distance, $x$, along respective, parallel, coextensive paths; means for projecting radiant energy toward said record means in a sheet-like beam intercepting one of said paths continuously between limits $x_1$ and $x_2$ and being affected by the indicia of the corresponding one of said functions $f(x)$ and $g(x)$; a triorthogonal mirror system disposed to intercept radiant energy subsequent to transmission through said record means at said one path for reflecting such radiant energy in a sheet-like beam intercepting the other of said paths on said record means continuously between the limits $x_1$ and $x_2$ and being affected by the indicia of the remaining of the functions $f(x)$ and $g(x)$ to provide resultant radiant energy; said mirror system including a reflector element rotatable about an axis in a plane equidistant from said paths for displacing said last-mentioned beam of radiant energy relative to the indicia representing the aforesaid remaining one of said functions $f(x)$ and $g(x)$; and means for indicating the intensity of said resultant radiant energy as a function of the position of said reflector element relative to a reference plane passing through said axis.

7. A system for deriving a correlation function of two functions $f(x)$ and $g(x)$ which may be the same or different comprising: record means having indicia depicting the functions $f(x)$ and $g(x)$ in terms of a modifying effect on incident radiant energy versus distance, $x$, along respective given paths; means for projecting radiant energy toward said record means in a sheet-like beam intercepting said paths continuously between limits $x_1$ and $x_2$ and being affected by the indicia of each of said functions $f(x)$ and $g(x)$ in succession to derive resultant radiant energy; means for relatively displacing said beam of radiant energy and the indicia representing one of said functions $f(x)$ and $g(x)$ periodically through a range of values of relative displacement; photoelectric means for deriving an electrical signal representing the total intensity of said resultant radiant energy; and means operative synchronously with the aforesaid relative displacement between said radiant energy and the indicia for indicating the instantaneous magnitude of said electrical signal as a function of such displacement.

8. A system for deriving a correlation function of two functions $f(x)$ and $g(x)$ which may be the same or different comprising: record means having indicia depicting the functions $f(x)$ and $g(x)$ in terms of a modifying effect on incident radiant energy versus distance, $x$, along respective given paths; means for projecting radiant energy toward said record means in a sheet-like beam intercepting said paths continuously between limits $x_1$ and $x_2$ and being affected by the indicia of each of said functions $f(x)$ and $g(x)$ in succession to derive resultant radiant energy; means for relatively displacing said beam of radiant energy and the indicia representing one of said functions $f(x)$ and $g(x)$ periodically through a range of values of relative displacement at a given frequency; photoelectric means for deriving an electrical signal representing the total intensity of said resultant radiant energy; means coupled to said photoelectric means for deriving a pulse-type signal exhibiting a pulse in time correspondence with each of selected peak values of the magnitude of said electrical signal; a generator of square waves synchronized by said pulse-type signal and having a positive cycle portion corresponding in time to the time between a successive pair of said pulses and the negative cycle portion corresponding in time to the time between the latter of said pair of pulses and the next successive pulse; and filter means coupled to said generator and tuned to a harmonic of said given frequency; and an indicator coupled to said filter means.

9. A system for deriving a correlation function of three functions $f_1(x)$, $f_2(x)$ and $f_3(x)$ which may be the same or different comprising: record means having indicia depicting the functions $f_1(x)$, $f_2(x)$ and $f_3(x)$ in terms of a modifying effect on incident radiant energy versus distance, $x$, along each of respective paths; means for projecting radiant energy toward said record means in a sheet-like beam intercepting said paths continuously between limits $x_1$ and $x_2$ and being affected by the indicia of each of said functions $f_1(x)$, $f_2(x)$ and $f_3(x)$ in succession and in the named order to derive resultant radiant energy; means for relatively displacing said beam of radiant energy and the indicia representing said function $f_2(x)$ and for relatively displacing said beam of radiant energy and the indicia representing said function $f_3(x)$; and means for indicating the intensity of said resultant radiant energy as a function of both of the aforesaid relative displacements between said radiant energy and the indicia.

10. A system for deriving a correlation function of three functions $f_1(x)$, $f_2(x)$ and $f_3(x)$ which may be the same or different comprising: record means having indicia depicting the functions $f_1(x)$, $f_2(x)$ and $f_3(x)$ in terms of a modifying effect on incident radiant energy versus distance, $x$, along each of respective paths; means for projecting radiant energy toward said record means in a sheet-like beam intercepting said paths continuously between limits $x_1$ and $x_2$ and being affected by the indicia of each of said functions $f_1(x)$, $f_2(x)$ and $f_3(x)$ in succession and in the named order to derive resultant radiant energy; a cathode ray type indicator having a viewing screen, a deflection system for controlling the position of visual indications derived on said viewing screen in first and second transverse coordinate directions, and means for controlling the intensity of said visual indications; means coupled to said deflection system for developing periodic sweeps of said visual indications in each of said coordinate directions; means for relatively displacing said beam of radiant energy and the indicia representing said function $f_2(x)$ and for relatively displacing said beam of radiant energy and the indicia representing said function $f_3(x)$ in synchronism with a respective one of said periodic sweeps; and photoelectric means disposed to intercept said resultant radiant energy and coupled to said intensity control means of said indicator for regulating the intensity of said visual indications in accordance with total intensity of said resultant radiant energy.

11. A system for deriving a correlation between two functions which may be the same or different comprising: record means having an opacity to incident light varying along a first path in accordance with one of the functions and along a second path in accordance with the other of the functions; means for projecting light toward said record means in a sheet-like beam intercepting said record means along said first path and thereafter intercepting said record means along said second path, said record means and said sheet-like beam being movable relative to one another in the direction of one of said paths; and light-sensitive recording means for intercepting light in said sheet-like beam subsequent to transmission through said record means along said second path.

12. A system for deriving a correlation between two functions which may be the same or different comprising: record means having a modifying effect on incident radiant energy varying along a first path in accordance with one of the functions and along a second path in accordance with the other of the functions; means for projecting radiant energy toward said record means in a sheet-like beam intercepting said record means along said first path and thereafter intercepting said record means along said second path; radiant energy-sensitive recording means for intercepting the radiant energy in said sheet-like beam subsequent to interception by said record means along said second path and for deriving a record of the light intensity at successive points along a line parallel to said second path; and means for displacing said record means in a direction parallel to said paths and for displacing said recording means in a direction essentially transverse to said line.

13. A system for deriving a correlation between two functions which may be the same or different comprising: record means having a modifying effect on incident radiant energy varying along a first path in accordance with one of the functions and along a second path in accordance with the other of the functions; means for projecting radiant energy toward said record means in a sheet-like beam intercepting said record means along said first path and thereafter intercepting said record means along said second path; an afocal optical system disposed to intercept radiant energy prior to interception by said record means along said second path for deriving an image of said record means along said first path having a selected relation to said record means along said second path; and means for deriving indications of a characteristic of the radiant energy in said sheet-like beam subsequent to interception by said record means along said second path.

14. A system for deriving a correlation function of two functions $f(x)$ and $g(x)$ which may be the same or different comprising: record means having indicia depicting the functions $f(x)$ and $g(x)$ in terms of a modifying effect on incident radiant energy versus distance, $x$, along respective paths, said functions being plotted to different scales on said record means; means for projecting radiant energy toward said record means in a sheet-like beam intercepting said paths continuously between limits $x_1$ and $x_2$ and being affected by the indicia of each of said functions $f(x)$ and $g(x)$ in succession to derive resultant radiant energy; an afocal optical system disposed to intercept radiant energy prior to interception by said indicia last affecting said radiant energy for deriving an image of said record means first affecting said radiant energy having a selected relation to said different scales; and means for indicating the intensity of said resultant energy along a line parallel to said paths.

15. A system for deriving a correlation between two functions which may be the same or different comprising: record means exhibiting a modifying effect on incident radiant energy varying along a first path in accordance with one of the functions and varying along a second path in accordance with the other of the functions; means for projecting radiant energy from each of a series of points along a line in a first plane toward said record means, intercepting said record means within said first path and emanating therefrom in parallel rays having a particular angular orientation relative to said first path for each of said points in said first plane and intercepting said record means within said second path; and means for utilizing radiant energy subsequent to interception by said record means at said second path to provide indications along another line.

16. A system for deriving a correlation between two functions which may be the same or different comprising: record means exhibiting a modifying effect on incident radiant energy varying along a first path in accordance with one of the functions and varying along a second path in accordance with the other of the functions; means for projecting radiant energy from each of a series of points along a line in a first plane; a collimating lens for intercepting said radiant energy and providing parallel rays having a particular angular orientation relative to said first path of each of said points in said first plane, intercepting said record means within said first path, thereafter intercepting said record means within said second path, and emanating therefrom in parallel rays; another collimating lens for intercepting radiant energy subsequent to interception by said second path of said record means to provide radiant energy at a series of points along another line in a plane, each of said points corresponding to parallel rays of radiant energy; and means for utilizing radiant energy at said other line.

17. A system for deriving a self-correlation for a function comprising: record means exhibiting a modifying effect on incident radiant energy varying along a given path in accordance with the function; means for project-radiant energy from each of a series of points along a line in a first plane toward said record means, intercepting said record means within said given path and emanating therefrom in parallel rays having a particular angular orientation relative to said first path for each of said points in said first plane and again intercepting said record means within said given path; and means for utilizing radiant energy subsequent to interception by said record means to provide indications along another line.

18. A system for deriving a correlation between two functions which may be the same or different comprising:

record means inhibiting a modifying effect on incident radiant energy varying along a first path in accordance with one of the functions and varying along a second path, parallel to and essentially coextensive with said first path, in accordance with the other of the functions; means for projecting radiant energy from each of a series of points along a line parallel to said first path toward said record means, intercepting said record means within said first path and emanating therefrom in parallel rays having a particular angular orientation relative to said first path for each of said points in said first plane and intercepting said record means within said second path; and means for utilizing radiant energy along another line parallel to said second path emanating subsequent to interception by said second path of said record means.

19. A system for deriving a correlation between two functions which may be the same or different comprising: record means exhibiting a modifying effect on incident radiant energy, said effect varying along a first path in accordance with one of the functions and along a second path in accordance with the other of the functions; means for projecting radiant energy toward said record means in a sheet-like beam intercepting said record means along said first path and thereafter intercepting said record means along said second path, said record means and said sheet-like beam being movable relative to one another in the direction of one of said paths; photoelectric means for deriving an electrical signal representative of the radiant energy in said sheet-like beam subsequent to interception by said record means along said second path; cathode ray indicator means including a display-control mechanism; means for utilizing said electrical signal to influence said display-control mechanism in one aspect; and means operative with relative displacement between said second means and said sheet-like beam for influencing said display-control mechanism in another aspect.

20. A system for deriving a correlation between two functions which may be the same or different comprising: record means exhibiting a modifying effect on incident radiant energy, said effect varying along a first path in accordance with one of the functions and along a second path in accordance with the other of the functions; means for projecting energy toward said record means in a sheet-like beam intercepting said record means along said first path and thereafter intercepting said record means along said second path, said record means and said sheet-like beam being movable relative to one another in the direction of one of said paths; photoelectric means for deriving an electrical signal representative of the radiant energy in said sheet-like beam subsequent to interception by said record means along said second path; cathode ray indicator means including display means and a display-control mechanism having one control element providing display deflection in a given direction and another control element providing display deflection in another direction transverse to said given direction; means for electrically coupling said photoelectric means to said one control element so that said electrical signal influences deflection in said given direction; and means electrically coupled to said other control element and operative with relative displacement between said record means and said sheet-like means for influencing deflection in said other direction.

21. A system for deriving a correlation function of two functions $f(x)$ and $g(x)$ which may be the same or different comprising: record means having indicia depicting the functions $f(x)$ and $g(x)$ in terms of a modifying effect on incident radiant energy versus distance, $x$, along respective, parallel, coextensive paths; means for projecting radian energy toward said record means in a sheet-like beam intercepting one of said paths continuously between limits $x_1$ and $x_2$ and being affected by the indicia of the corresponding one of said functions $f(x)$ and $g(x)$; a tri-orthogonal mirror system disposed to intercept radiant energy subsequent to transmission through said record means at said one path for reflecting such radiant energy in a sheet-like beam intercepting the other of said paths on said record means continuously between the limits $x_1$ and $x_2$ and being affected by the indicia of the remaining of the functions $f(x)$ and $g(x)$ to provide resultant radiant energy, said mirror system including a reflector element rotatable about an axis in a plane equidistant from said paths for displacing said last-mentioned beam of radiant energy relative to the indicia representing the aforesaid remaining one of said functions $f(x)$ and $g(x)$; photoelectric means for deriving an electrical signal representative of the intensity of said resultant radiant energy; cathode ray means including a display-control mechanism; means for utilizing said electrical signal to influence said display-control mechanism in one aspect; and means operative in accordance with the position of said reflector element relative to a reference plane passing through said axis for influencing said display-control mechanism in another aspect.

22. Computing apparatus comprising: a line source of radiant energy; a compound optical system having at least two spaced apart focussing elements for producing an image of the line source; first and second radiant energy modifying means located intermediate the focussing elements for successively modifying the radiant energy from the line source in accordance with functions of a variable; and means for providing an indication of the radiant energy distribution along the length of the image.

References Cited in the file of this patent

UNITED STATES PATENTS

| | | |
|---|---|---|
| 2,179,000 | Tea | Nov. 7, 1939 |
| 2,410,550 | Padva | Nov. 5, 1946 |
| 2,451,465 | Barney | Oct. 19, 1948 |
| 2,712,415 | Piety | July 5, 1955 |
| 2,839,149 | Piety | June 17, 1958 |